United States Patent [19]

Mesey et al.

[11] Patent Number: 4,535,573
[45] Date of Patent: Aug. 20, 1985

[54] PROFILING APPARATUS FOR A GRINDING WHEEL IN A GEAR GRINDING MACHINE

[75] Inventors: Milton Mesey, Wallisellen; Roman Shcwaighofer, Geroldswil; Meinrad Donner, Nuolen, all of Switzerland

[73] Assignee: Maag Gear-Wheel & Machine Company Limited, Zurich, Switzerland

[21] Appl. No.: 562,085

[22] Filed: Dec. 16, 1983

[30] Foreign Application Priority Data

Dec. 24, 1982 [CH] Switzerland ............... 7543/82

[51] Int. Cl.³ ............................................. B24B 53/00
[52] U.S. Cl. .............................. 51/165.87; 125/11 B; 125/11 AS; 125/11 BS
[58] Field of Search ........... 51/165.87, 165.88, 165.72, 51/165.77; 125/11 R, 11 B, 11 BS, 11 AS

[56] References Cited

U.S. PATENT DOCUMENTS

| 2,392,668 | 1/1946 | Helding | 125/11 A |
| 2,565,013 | 8/1951 | Bargren | 125/11 B |
| 4,015,372 | 4/1977 | Fukuma | 51/165.77 |
| 4,203,260 | 5/1980 | Fivian | 51/165.88 |
| 4,213,277 | 7/1980 | Fivian | 51/325 |

FOREIGN PATENT DOCUMENTS

| 2140978 | 3/1972 | Fed. Rep. of Germany . |
| 2726843 | 9/1978 | Fed. Rep. of Germany . |
| 3112084 | 3/1982 | Fed. Rep. of Germany . |
| 3112804 | 4/1982 | Fed. Rep. of Germany . |
| 3213046 | 7/1983 | Fed. Rep. of Germany . |
| 3213047 | 7/1983 | Fed. Rep. of Germany ... 51/165.87 |

OTHER PUBLICATIONS

Extract from the Journal "Industrie-Anzeiger", (pp. 12 to 20), No. 54, dated Jul. 3, 1981.

*Primary Examiner*—Harold D. Whitehead
*Attorney, Agent, or Firm*—Werner W. Kleeman

[57] ABSTRACT

A grinding wheel contains two ring-shaped flanks and is axially displaceable by an axial drive. A radial slide is radially adjustably displaceable relative to the grinding wheel by a radial drive. Both of the displacements in axial and radial direction can be measured by a respective displacement path measuring device. Two dressing tools can be independently reciprocatingly displaced between an operative position and a wear measuring position at the radial slide. A wear measuring device is arranged at the radial slide for measuring in a direction extending substantially parallel to the grinding wheel axis the wear of the dressing tools. The relative displacement in the direction of the grinding wheel axis is governed by the desired flank profile, and a control increases such relative displacement in the direction of the grinding wheel axis by the amount of the wear of the dressing tools.

12 Claims, 3 Drawing Figures

PROFILING APPARATUS FOR A GRINDING WHEEL IN A GEAR GRINDING MACHINE

CROSS-REFERENCE TO RELATED APPLICATION

This application is related to the commonly assigned, copending U.S. application Ser. No. 06/562,083, filed Dec. 16, 1983, entitled "Gear Grinding Machine Including Double-cone Shaped Grinding Wheel"

BACKGROUND OF THE INVENTION

The present invention relates to a new and improved profiling apparatus for dressing a grinding wheel in a gear grinding machine.

In its more particular aspects the present invention relates to a new and improved profiling apparatus for a grinding wheel in a gear grinding machine which comprises at least one dressing tool for a substantially ring-shaped flank of the grinding wheel, axial and radial drive means for relative displacements between the dressing tool and the grinding wheel relative to the grinding wheel axis either in the direction thereof or at right angles thereto, and a control for matching or coordinating such relative displacements to each other such that the dressing operation is performed in corresponding with a desired or required profile of the flank of the grinding wheel.

In a profiling apparatus of this kind as known, for example, from German Patent Publication No. 2,140,978, published Mar. 30, 1982, only one dressing tool is provided which is arranged at a dressing unit or device. The dressing unit can be displaced parallel to and at right angles to the grinding wheel axis, whereas the grinding wheel is mounted to a stationarily arranged grinding spindle which only can be driven for rotation. No means are evident therefrom for compensating the wear of the dressing tool within the ambit of the control for the dressing unit. In order to control whether the dressing tool operates upon the entire surface of the grinding wheel intended to be dressed, there is measured the contact displacement of the dressing tool during each dressing stroke and the measured value is compared with a predetermined reference or set value. Further dressing strokes are performed until the two values conform to one another. For this control a signal transmitter is mounted with the dressing unit which responds to the contact of the dressing tool at the grinding wheel and generates an electrical signal. This signal is processed so as to form pulses which represent a measure of the contact time, and thus, the contact displacement of the dressing tool. The signals are added and constitute the actual value of the contact displacement path. A measure or dimension for the wear of the dressing tool can not be derived therefrom.

In a further prior art apparatus for dressing a ring surface of an axially repositionable or adjustable disk-shaped or dished grinding wheel in a gear grinding machine as known, for example, from German Patent Publication No. 2,726,843, published Nov. 9, 1978, and the corresponding U.S. Pat. No. 4,213,277, granted July 22, 1980, the position of the ring surface is controlled and the grinding wheel is repositioned in such a way that the ring surface stays at the same place independently of the wear. Such apparatus comprises an axially displaceable or advanceable dressing tool which is displaced along an arc-shaped path over the ring surface of the grinding wheel each time a dressing operation is performed. To that end, a lever which carries the dressing tool is pivoted about an axis which extends parallel to the grinding wheel axis. The ring surface of the grinding wheel which is to be dressed is scanned by a sensor or feeler which generates a signal each time the position of the ring surface deviates from a reference position. The signals from the scanner or feeler are transformed by control means into commands for displacing the grinding wheel and the dressing tool. Profiling of the grinding wheel in such a manner that the operative or working ring surface thereof could assume any desired profile possibly even deviating from a straight line, is impossible when using the known dressing device described hereinbefore.

However, in another profiling device for a grinding wheel in a gear grinding machine as known, for example, from German Patent Publication No. 3,112,084, published Mar. 4, 1982, two dressing tools are provided by means of which the flanks of a grinding wheel which substantially possesses the shape of a truncated cone can be dressed and provided with profile corrections. Each of the dressing tools is mounted at one end of a respective ram or plunger, the longitudinal axis of which extends in a plane which contains the grinding wheel axis. Each of the rams is longitudinally displaceable within a guide housing and is mounted for rotation. The two guide housings can be pivoted about a common pivot axis independently of each other. The common pivot axis extends in the central plane of the grinding wheel and at a distance from the grinding wheel axis. Both of the rams are designed as round toothed racks and mesh with a common pinion arranged on the pivot axis. At the end of each ram which is located remote from the dressing tool there is mounted a scanning or feeler arm which cooperates with a stencil which is exchangeably mounted to the associated guide housing in such a way that the relevant ram is rotated about its longitudinal axis during its longitudinal displacement. The associated dressing tool is thus pivoted about the longitudinal axis when the flank to be dressed at the grinding wheel is intended to be provided with a correction. During this correction the wear of the dressing tool is not taken into account.

SUMMARY OF THE INVENTION

Therefore, with the foregoing in mind, it is a primary object of the present invention to provide a new and improved profiling apparatus for a grinding wheel in a gear grinding machine which enables the wear of the dressing tool or dressing tools to be compensated during the production and dressing of the profile of a flank of the grinding wheel.

Another important object of the present invention is directed to the provision of a new and improved profiling apparatus for a grinding wheel in a gear grinding machine which affords a particularly simple compensation of the wear of the dressing tool or dressing tools during the production and dressing of the profile of a flank of a grinding wheel.

Still a further significant object of the present invention is directed to a new and improved profiling apparatus for dressing a grinding wheel in a gear grinding machine which enables reliable compensation of the wear of the dressing tool or dressing tools in producing and dressing the profile of a flank of the grinding wheel.

Now in order to implement these and still further objects of the invention, which will become more readily apparent as the description proceeds, the apparatus of the present development is manifested by the features that, the dressing tool is arranged at a radial slide which is displaceable by radial drive means for performing relative displacements at right angles with respect to the grinding wheel axis, a respective displacement measuring device is provided for measuring each of the aforementioned relative displacements or movements, the dressing tool at the radial slide is reciprocatingly displaceable between an operative position and a wear measuring position, a wear measuring device is arranged at the radial slide by means of which the wear of the dressing tool can be measured in a direction substantially parallel to the grinding wheel axis, and the control increases the relative displacement in the direction of the grinding wheel axis resulting from the required flank profile by the amount of the wear of the dressing tool.

By virtue of the arrangement of the wear measuring device at the radial slide itself there result short travel paths for the dressing tool or each dressing tool between the operative or working position and the wear measuring position thereof. The possibilities for introducing errors are correspondingly small. Readjustment between the dressing tool and the radial slide is not intended during normal operation. The support of the dressing tool or dressing tools at the radial slide can therefore be designed to be sturdy with little constructional expense in such a manner that the reaction forces exerted by the grinding wheel upon the dressing tool are not able to cause deformations from which would result inaccuracies in the position of the dressing tool. Independently of the dressing operation the axial displaceability of the grinding wheel can be utilized during the grinding operation, for example, for test operations for contacting the grinding wheel with a workpiece. The constructional expense for the axial displaceability of the grinding wheel, therefore, can be partially, if at all, allocated to the profiling apparatus. The additional constructional expense required for the automatic compensation for the wear of the dressing tool or dressing tools is small in any case.

In a preferred embodiment of the profiling apparatus according to of the invention two dressing tools are arranged at the radial slide each of which is associated with one flank of the grinding wheel. The two dressing tools can be alternatingly displaced into their operative position. The wear measuring device comprises stops which are arranged between the wear measuring positions of the two dressing tools. The wear measuring device can be alternatingly loaded with oppositely directed forces which displace a respective one of the stops towards a respective one of the dressing tools. The additional advantage achieved thereby is that one and the same wear measuring device can be used to measure the wear of one of the two dressing tools while the other dressing tool assumes its operative position. The total constructional expense and time requirement for establishing the wear of the two dressing tools is thereby maintained specifically small.

Preferably the last-mentioned design of the profiling apparatus according to the invention is further developed in such a manner that the stops can be adjusted at an inclination which corresponds to the inclination of a related flank at the grinding wheel. Conventionally, the dressing tools are arranged in such a way that during the dressing operation their axes extend at least approximately perpendicular to the flank of the grinding wheel which is intended to be dressed. Accordingly, the stops or abutments of the wear measuring device are also adjusted in such a manner that the axis of the associated dressing tool also extends normally or perpendicular to the stop surface during the measurement. Measuring inaccuracies are thus positively avoided.

According to a further advantageous construction the dressing tools can be reciprocatingly pivoted or moved back-and-forth between the operative or working position and the wear measuring position independently of each other about a common pivot axis which extends substantially parallel to the grinding wheel axis. In this manner the profiling apparatus can be of a particularly simple design as far as it is formed by the radial slide and the components arranged thereat.

Advantageously, each of the dressing tools can be reciprocatingly displaced between the operative or working position and its wear measuring position independently of the other dressing tool in the event that the profiling apparatus contains two dressing tools, each of which is operatively associated with a respective flank of the grinding wheel.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
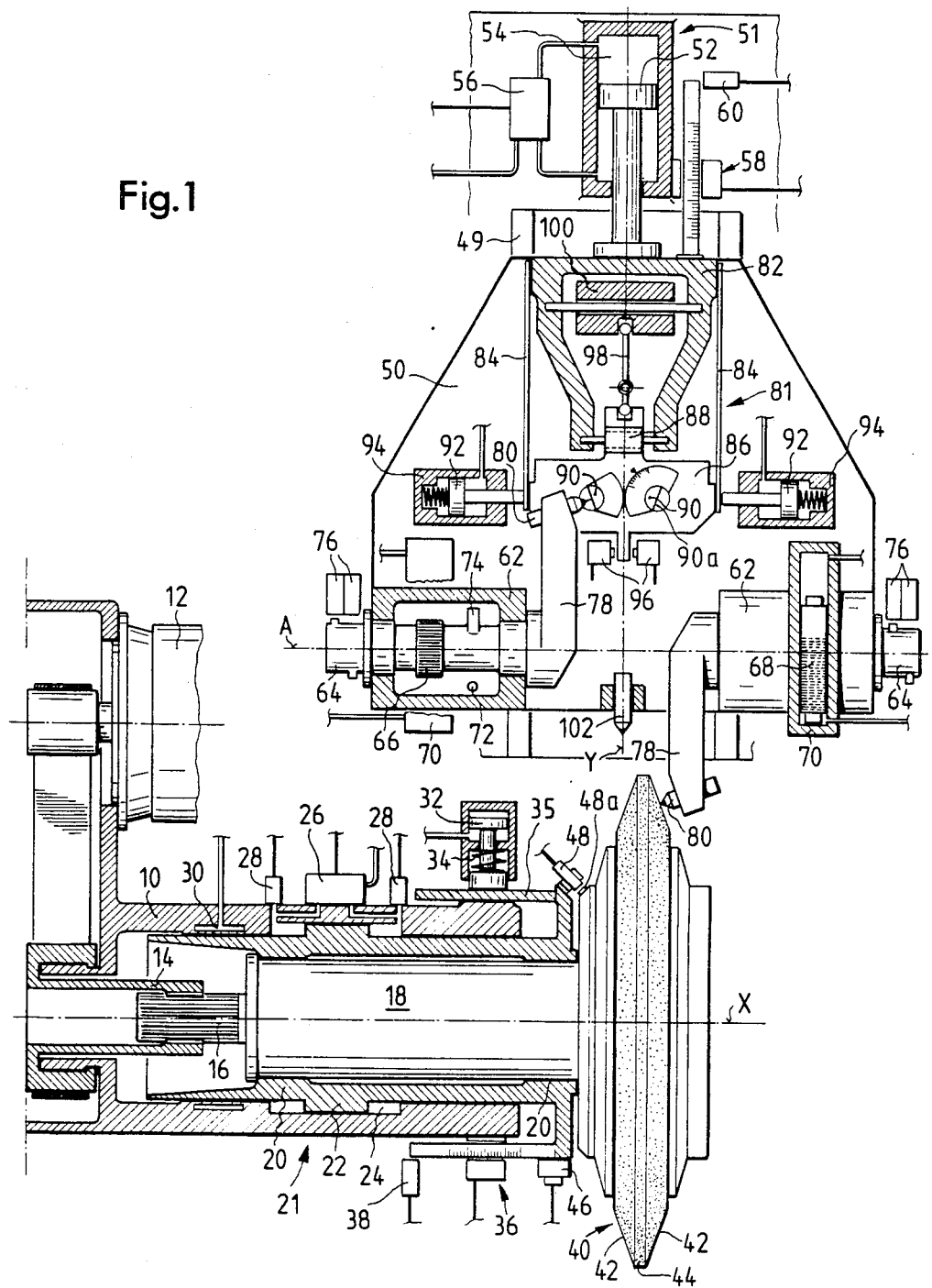
FIG. 1 is an axial section through parts of a gear grinding machine containing a first embodiment of the profiling apparatus constructed according to the present invention.

Describing now the drawings, it is to be understood that only enough of the construction of the gear grinding machine has been shown as needed for those skilled in the art to readily understand the underlying principles and concepts of the present development, while simplifying the showing of the drawings. Turning attention now specifically to FIG. 1, there have been illustrated therein parts of a gear grinding machine comprising a carrier or support sleeve 10 to which there is flanged or mounted a drive motor 12 which drives a grinding spindle 18 via a hollow shaft 14 which is provided with a multi-grooved profile or splines or the like and engages with a trunnion or journal 16 of the grinding wheel spindle 18 which is axially displaceably received in the hollow shaft 14. The grinding wheel spindle 18 is journalled in a spindle or support sleeve 20 which is axially displaceably guided in the carrier sleeve 10.

Axial drive means 21 are provided to displace the spindle sleeve 20 including the grinding wheel spindle 18. The axial drive means 21 substantially comprises a piston 22 which is formed at the spindle sleeve 20, a double-acting cylinder 24 which is formed at the carrier sleeve 10 and which forms two not particularly referenced chambers or compartments which are separated from each other by the piston 22, and a servo-valve 26 by means of which pressure or pressurized oil is supplied to the cylinder chambers. The pressure in each of the two chambers can be measured by a related pressure gauge or measuring device 28.

By using hydraulic clamping means 30 the spindle sleeve 20 including the grinding wheel spindle 18 can be fixedly clamped in any desired axial position which can be adjusted by the axial drive means 21. A mechanical clamping device 32 is normally held by oil pressure in an inoperative position. In the case of failure of the hydraulic pressure the mechanical clamping device 32 is pressed against a clamping beam or bar 35 mounted at the spindle sleeve 20 by means of a spring 34, in order to thus solidly or fixedly positionally clamp the spindle sleeve 20.

An incremental displacement or path measuring device 36 is constituted by a grating or line grid and by a reader in a manner known as such and is operatively associated with the spindle sleeve 20 and the grinding wheel spindle 18 which is mounted therein for radial and axial displacement. Furthermore, a proximity switch 38 is operatively associated with the spindle sleeve 20 by means of which the zero or null point for the indication of the displacement measuring device 36 can be located or determined each time the operation is started.

At the free end of the grinding wheel spindle 18 there is mounted a grinding wheel 40 which contains two oppositely directed flanks 42 which substantially have the shape of a truncated cone, and a substantially cylindrical surface 44 interconnecting these two cone-shaped flanks 42. During its action upon a workpiece as well as during dressing of either one of the flanks 42 or the cylindrical surface 44 the grinding wheel 40 can be monitored by means of a vibroscope or vibrating meter 46 arranged at the spindle sleeve 20. Furthermore, a proximity switch 48 or equivalent structure is arranged at the spindle sleeve 20 in order to determine the rotational speed of the grinding wheel 40 and cooperates with an appropriate component or part 48a conjointly revolving with the grinding wheel 40.

The grinding wheel 40 can be displaced along a grinding wheel axis X by the axial drive means 21. The grinding wheel axis X forms a rectangular coordinate system together with a vertical center axis Y which extends normally to the grinding wheel axis X. A guide or guide means 49 is stationarily arranged with respect to the gear grinding machine and a radial slide or carriage 50 is disposed above the grinding wheel 40 and is displaceable along the center axis Y at the guide 49.

Controllable radial drive means 51 are provided to displace the radial slide 50. The radial drive means 51 substantially comprise a piston 52 mounted at the radial slide 50, a double-acting cylinder 54 which is stationarily arranged with respect to the gear grinding machine and within which the piston 52 separates two not particularly referenced chambers from each other, and a servo-valve 56 or equivalent structure for controlling the pressure in the two chambers. Furthermore, an incremental displacement or path measuring device 58 is operatively associated with the radial slide 50 and the zero or null point position thereof is determined by means of a proximity switch 60 or equivalent structure.

On the two sides of the center axis Y there is arranged at the radial slide 50 a respective pivot bearing 62 including a shaft 64 journalled therein. The two shafts 64 have a common geometrical axis which is designated as the pivot axis A in the following description, and this pivot axis A extends substantially parallel to the grinding wheel axis X and intersects the center axis Y at right angles.

Within the associated pivot bearing 62 a respective pinion 66 is formed or provided at each one of the two shafts 64. Each of these two pinions 66 meshes with a respective toothed rack 68 which is guided in a double-acting hydraulic cylinder 70 in the manner of a piston such that each one of the shafts 64 can be rotated back and forth through an angle of at least 180°. A pair of adjustable stops or abutments 72 is operatively associated with each one of the shafts 64. The stops or abutments 72 are also arranged within the associated pivot bearing 62 and cooperate with a bolt 74 or the like which is radially threaded into the related shaft 64, in such a manner as to limit the range of rotation of such shaft 64. Furthermore, two proximity switches 76 are operatively associated with each one of two shafts 64 to enable the determination of whether the related shaft 64 has arrived at the one or the other end or terminal position of its rotational range.

A pivot arm or arm member 78 is mounted at each shaft 64 and carries a dressing tool 80. The two dressing tools 80 serve to dress a respective one of the two flanks 42 of the grinding wheel 40 and can be pivoted back-and-forth between an operative or working position and a wear measuring position by rotating the associated shaft 64 by 180°. FIG. 1 shows the right-hand dressing tool 80 in its operative or working position and the left-hand dressing tool 80 in its wear measuring position. The pivoting movements of the two dressing tools 80 are coordinated with each other such that at any given time only one of the two dressing tools 80 assumes its operative position. In each instance each dressing tool 80 assumes its operative or working position prior to that moment of time when the radial slide 50 arrives at the position shown and in which position the relevant dressing tool 80 can contact the associated flank 42 of the grinding wheel 40. This flank 42 is then dressed by coordinated or matched displacements of the grinding wheel 40 along the grinding wheel axis X and the radial slide 50 along its center axis Y.

To be able to determine at any time whether and, if so, to what extent the dressing tools 80 are worn, a wear measuring device 81 is advantageously arranged at the radial slide or slide member 50. A base or socket member 82 which is mounted to the radial slide 50 belongs to the wear measuring device 81 and this base 82 is connected to a bridge member 86 via a pair of leaf springs 84 or equivalent structure. In their rest position as shown the two leaf springs 84 extend substantially parallel to the center axis Y, each intersecting the grinding wheel axis X at substantially right angles. Consequently, the bridge member 86 can be reciprocatingly displaced substantially parallel to the grinding wheel axis X. A plunger or immersion coil 88 is operatively associated with the bridge member 86 in order to measure the displacements thereof.

Two stops or abutments 90 are mounted at the bridge member 86 and each of them contains a stop or impact surface 90a and is operatively associated with a respective one of the dressing tools 80. By rotating each such stop 90 the related stop surface 90a thereof can be adjusted so as to extend at substantially right angles relative to the axis of the associated dressing tool 80. When the dressing tools 80 have been newly installed or readjusted, each dressing tool 80, in its wear measuring position, has a clearness of, for instance, 0.2 mm relative to the associated stop or abutment 90. This clearance increases due to wear of the dressing tools 80. Such clearance increase is added to the axial displacement of the grinding wheel 40 which occurs during the dressing operation.

To ensure that the bridge member 86 assumes the central or intermediate position illustrated in FIG. 1, when one of the dressing tools 80 is pivoted into its wear measuring position, on each side of the bridge member 86 a piston 92 is guided in a related cylinder 94 arranged at the radial slide 50. Each piston 92 is spring loaded such as to tend to prevent a deflection of the bridge member 86 in the direction of the associated cylinder 94. For the measurement of the wear of the one or the other dressing tool 80 the action of the relevant piston 92 on the bridge member 86 can be removed by supplying pressurized oil or another suitable pressurized fluid medium to the associated cylinder 94.

A pair of electromagnets 96 is operatively associated with the bridge member 86 and either one of these two electromagnets 96 can be energized depending upon which one of the two dressing tools 80 is intended to be measured or checked. By energizing the relevant electromagnet 96 the bridge member 86 is displaced in such a manner that the corresponding stop or abutment 90 is pressed against the associated dressing tool 80. The deflection of the bridge member 86 from its central position which thus occurs is measured by means of the plunger or immersion coil 88.

To prevent the measurement described hereinbefore from being negatively affected by any eventual inclined position of the radial slide 50 and weight loads or forces caused thereby which asymmetrically act upon the bridge member 86, the bridge member 86 is connected to a balancing or compensation mass 100 by means of a two-armed lever 98 which is mounted at the radial slide 50. This balancing mass 100 is guided at the base or socket member 82 for reciprocating or to-and-fro movements substantially parallel to the bridge member 86 and in opposition to the displacements of the bridge member 86.

A dressing tool 102 for dressing the for instance cylindrical outer or jacket surface 44 of the grinding wheel 40 is arranged at the lower edge of the radial slide 50 essentially on the center axis Y.

Figure 2:
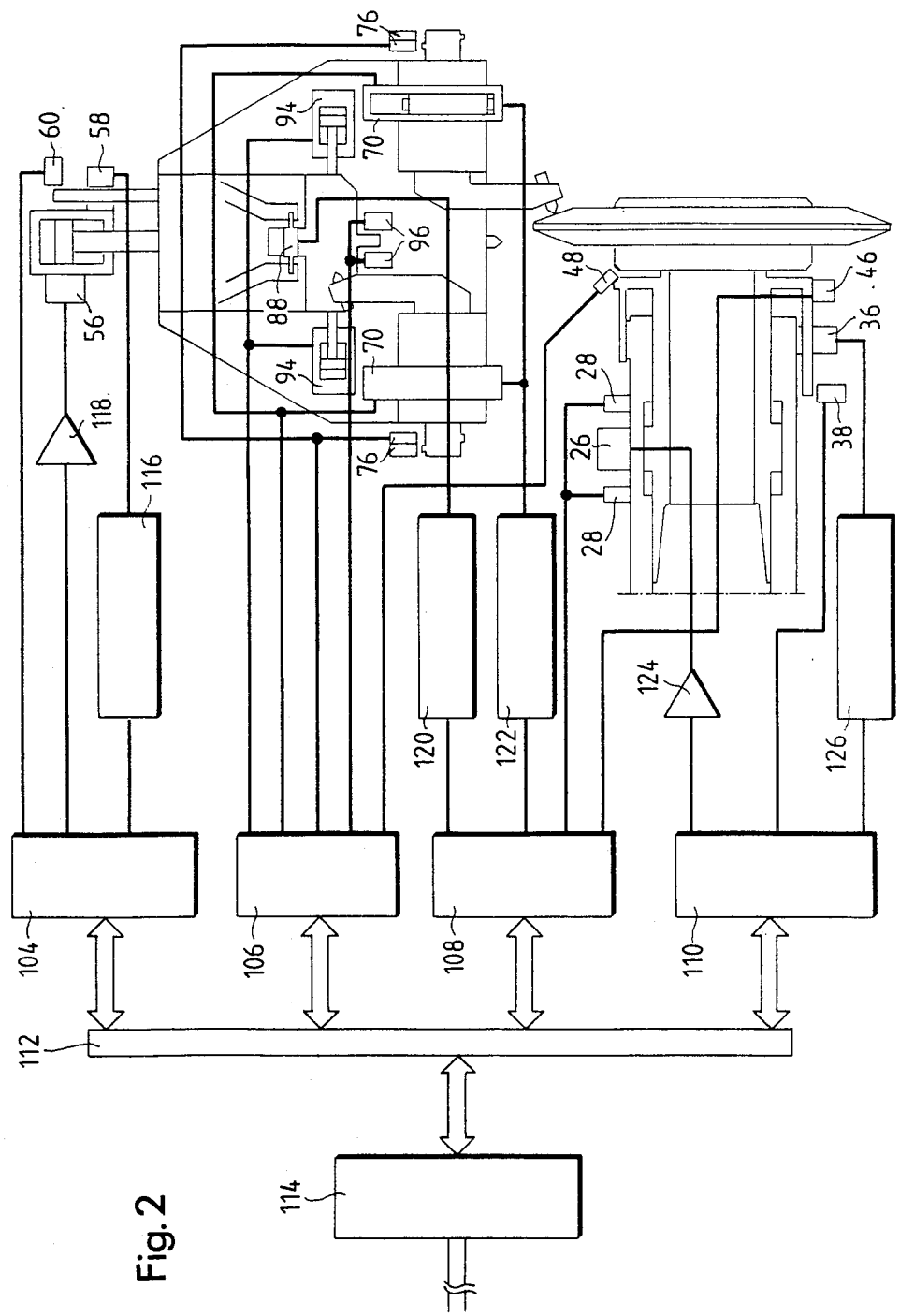
FIG. 2 is a block diagram of the control or control means for the profiling apparatus shown in FIG. 1.

The drive means and measuring devices described hereinbefore are illustrated with thin lines in FIG. 2 in conjunction with the associated control or control means. The main components of the control comprise a displacement or path detection circuit 104 which is operatively associated with the radial drive means 51 including the displacement or path measuring device 58, a position pick-up circuit 106 which is operatively associated with the mechanical clamping device 32 and with parts of the wear measuring device 81, an A/D- and D/A- converter 108 which is operatively associated with the vibroscope 46, with the axial drive means 21, with the proximity switch 48 as well as with parts of the wear measuring device 81, and a further displacement detection circuit 110, which, above all, is operatively associated with the axial drive means 21. These circuits 104, 106, 108 and 110 are connected to a program or operating control by means of a data bus 112 as, for example, contained in the component ISPX-88/40 commercially available from the well known United States company INTEL Corporation.

The displacement or path detection circuit 104 is known to the art and described in German Patent Publication No. 3,213,046, to which reference may be had and the disclosure of which is incorporated herein by reference and, therefore, is not here further described in any particular detail. This displacement or path detection circuit 104 is operatively connected to the displacement measuring device 58 via a pulse former or shaper 116 and is further connected to the servo-valve 56 via an amplifier 118. Finally, the displacement or path detection circuit 104 is directly connected to the proximity switch 60.

The position pick-up circuit 106 is contained in, for example, the component ICS910 likewise commercially available from INTEL Corporation.

The A/D- and D/A- converter 108 is formed, for example, by the components ISPX-311 and ISPX-328 equally commercially available from INTEL Corporation. This converter 108 is connected to the plunger or immersion coil 88 via circuit 120 and to a proportional valve control 122 for controlling the cylinders 70. Circuit 120 appropriately processes the signals from the plunger coil 88 in such a manner that they can be suitably further processed in analog fashion. The valve control 122 controls the pivoting rate or velocity of the shafts 64.

The displacement or path detection circuit 110 is structured in the same manner as the displacement or path detection circuit 104. This circuit 110 is operatively connected to the servo-valve 26 by means of an amplifier 124 and to the displacement or path measuring device 36 by means of a pulse former or shaper 126.

Figure 3:
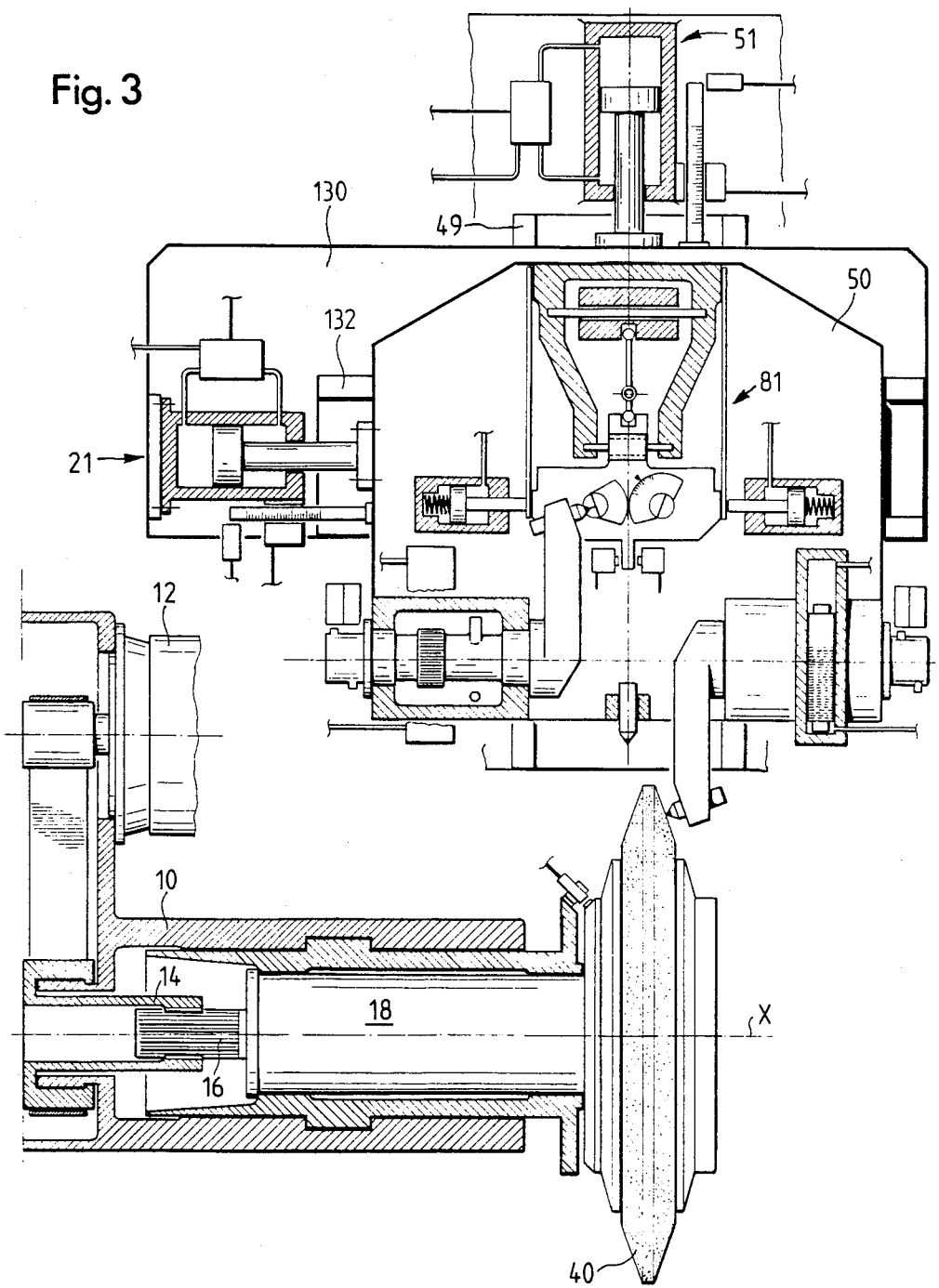
FIG. 3 is an axial section through parts of a gear grinding machine containing a second embodiment of the profiling apparatus according to the invention.

A second embodiment of profiling apparatus constructed according to the present invention is illustrated in FIG. 3 and differs from the disclosed construction of profiling apparatus illustrated in FIGS. 1 and 2 in that here a cross-slide 130 is guided at the guide or guide means 49. This cross-slide 130, in turn, guides the radial slide or slide member 50 by guiding means 132 which are formed at the cross-slide 130 and which extend substantially parallel to the grinding wheel axis X. In this embodiment the axial drive means 21 operatively interconnect the cross-slide 130 and the radial slide 50 while the grinding spindle 18 is axially non-displaceably mounted. In the embodiment shown in FIG. 3 the radial drive means 51 are no longer directly connected to the radial slide 50, but to the cross-slide 130.

While there are shown and described present preferred embodiments of the invention, it is to be distinctly understood that the invention is not limited thereto, but may be otherwise variously embodied and practiced within the scope of the following claims. Accordingly,

What we claim is:

1. A profiling apparatus for at least one substantially ring-shaped flank of a grinding wheel having a grinding wheel axis in a gear grinding machine, comprising:
   at least one dressing tool for dressing the substantially ring-shaped flank of the grinding wheel;
   a radial slide displaceable at substantially right angles relative to said grinding wheel axis;
   said at least one dressing tool being arranged at said radial slide;
   radial drive means for relative radial displacement between said at least one dressing tool and said grinding wheel at substantially right angles relative to said grinding wheel axis;

a radial displacement measuring device for measuring the radial displacement of said dressing tool relative to said grinding wheel;

said at least one dressing tool defining an operative position and a wear measuring position at said radial slide;

means for displacing said at least one dressing tool between said operative position and said wear measuring position;

a wear measuring device arranged at said radial slide by means of which the wear of said at least one dressing tool can be measured;

axial drive means for relative axial displacement between said at least one dressing tool and said grinding wheel in the direction of said grinding wheel axis;

an axial displacement measuring device for measuring the axial displacement of said at least one dressing tool relative to said grinding wheel;

control means for coordinating said relative radial and axial displacements of said dressing tool and said grinding wheel in correspondence to a desired flank profile of said substantially ring-shaped flank of said grinding wheel; and said control means increasing said relative axial displacement of said dressing tool and said grinding wheel essentially by the amount of the wear of said at least one dressing tool.

2. The apparatus as defined in claim 1, wherein:

two said dressing tools are arranged at said radial slide;

each of said two dressing tools being operatively associated with respective ones of two flanks at said grinding wheel;

said two dressing tools being alternatingly displaceable to assume a respective operative position;

said wear measuring device comprising two stops arranged between said wear measuring positions of said two dressing tools; and means for alternatingly subjecting said wear measuring device to oppositely directed forces in order to displace a selected one of said stops towards a respective one of said two dressing tools.

3. The apparatus as defined in claim 2, wherein:

each of said stops is adjustable at an inclination essentially corresponding to a predetermined inclination of an associated one of said two flanks at said grinding wheel.

4. The apparatus as defined in claim 2, wherein:

said two dressing tools define a common pivot axis extending substantially parallel to said grinding wheel axis; and means mounting said two dressing tools to be selectively pivotable independently of each other about said common pivot axis between said operative position and said wear measuring position.

5. The apparatus as defined in claim 1, further including:

two dressing tools each one of which is operatively associated with a respective one of two flanks at said grinding wheel; and means mounting each one of said two dressing tools to as to be displaceable independently of the other one of said two dressing tools between said operative position and said wear measuring position.

6. The apparatus as defined in claim 5, wherein:

said mounting means include means for stationarily arranging said two dressing tools in axial direction of the grinding wheel axis; and said axial drive means axially reciprocatingly displacing said grinding wheel in order to profile said two flanks thereof and to compensate for the wear of said two dressing tools.

7. The apparatus as defined in claim 6, further including:

a grinding wheel spindle;

a spindle sleeve for mounting said grinding wheel spindle cooperating with said spindle sleeve;

a carrier sleeve;

said axial drive means comprising a double-acting hydraulic piston-cylinder unit;

the piston of said piston-cylinder unit being formed at said spindle sleeve and the cylinder of said piston-cylinder unit being formed at said carrier sleeve; and a servo-valve controlling said hydraulic piston-cylinder unit.

8. The apparatus as defined in claim 5, further including:

means for displaceably arranging said two dressing tools with respect to the direction of said grinding wheel axis; and said axial drive means acting to axially reciprocatingly displace said two dressing tools relative to said grinding wheel which is stationarily positioned in order to profile said two flanks thereof and to compensate for wear of said two dressing tools.

9. The apparatus as defined in claim 8, wherein:

said displaceably arranging means for said two dressing tools comprises a cross-slide carrying said axial drive means;

guide means arranged at said cross-slide for axially guiding said radial slide at said cross-slide; and said axial drive means being arranged at said cross-slide and operatively connected to said radial slide for axially and reciprocatingly displacing the same.

10. The apparatus as defined in claim 9, wherein:

said axial drive means comprise a double-acting hydraulic piston-cylinder unit, the cylinder of which is stationarily arranged at said cross-slide and the piston of which is connected to said radial slide;

said cylinder being subdivided by said piston in order to form two cylinder chambers; and said axial drive means further comprising a servo-valve for controlling hydraulic pressure effective in said two cylinder chambers.

11. The apparatus as defined in claim 1, wherein: said wear measuring device measures in the direction of the grinding wheel axis the wear of said at least one dressing tool.

12. The apparatus as defined in claim 11, wherein: said direction extends substantially parallel to the grinding wheel axis.

* * * * *